July 2, 1968    F. P. MATTSON    3,390,520
AIR SUPPLYING DEVICE FOR INTERNAL-COMBUSTION ENGINES
Filed Aug. 4, 1967    3 Sheets-Sheet 1
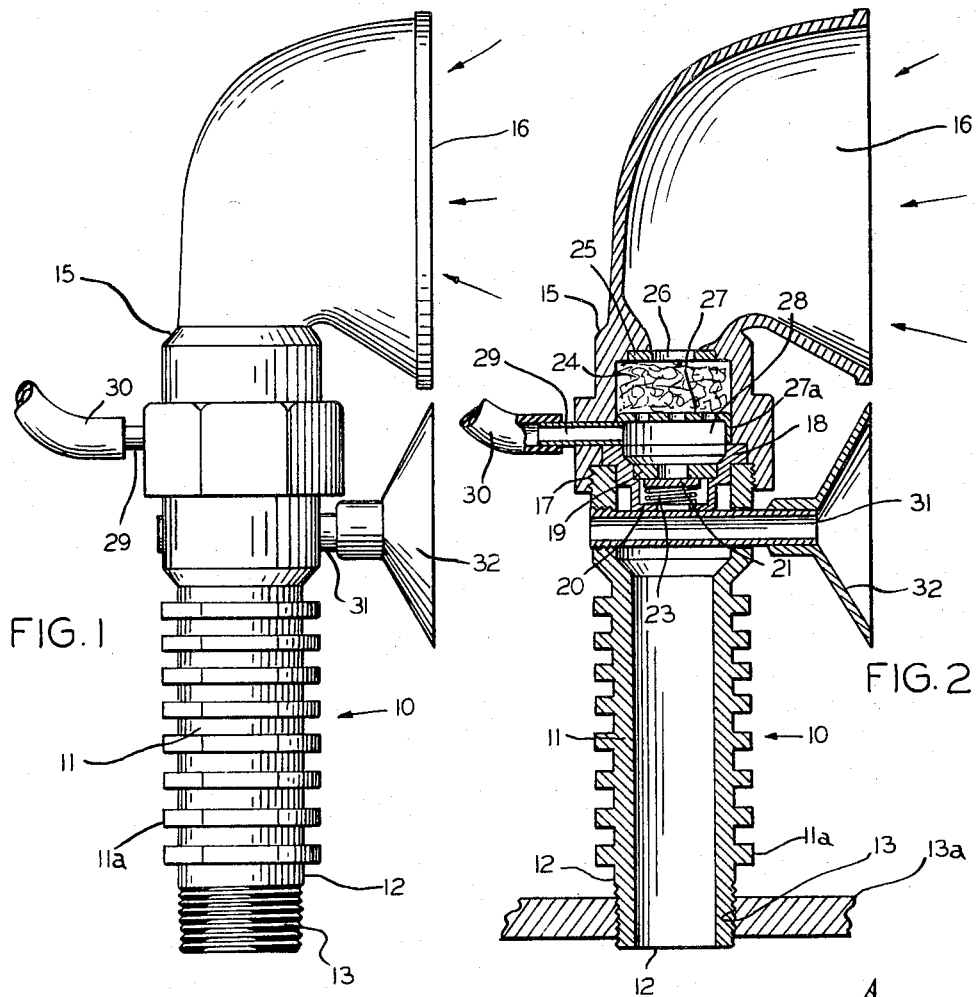
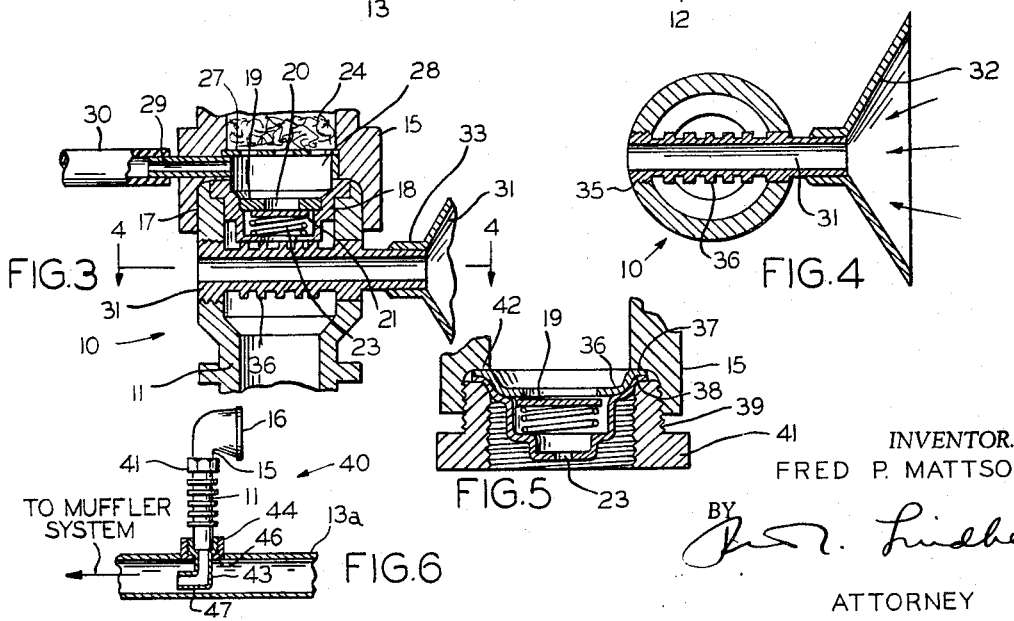
INVENTOR.
FRED P. MATTSON
BY
*R. T. Lindberg*
ATTORNEY July 2, 1968  F. P. MATTSON  3,390,520
AIR SUPPLYING DEVICE FOR INTERNAL-COMBUSTION ENGINES
Filed Aug. 4, 1967  3 Sheets-Sheet
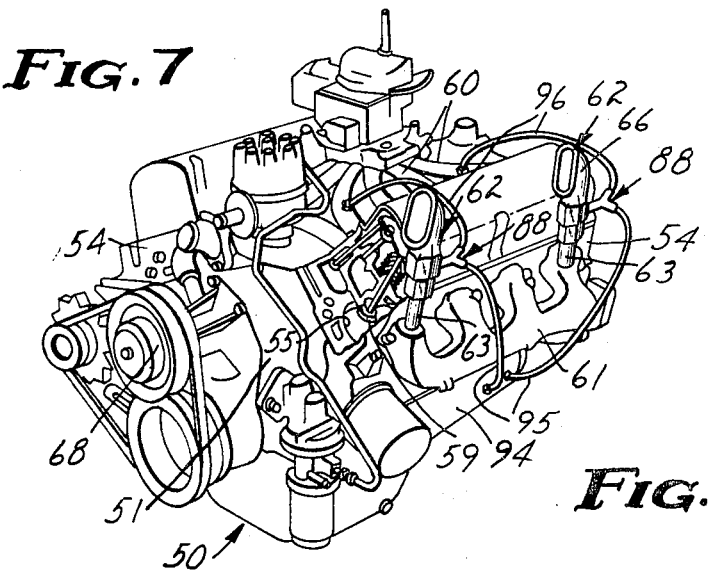
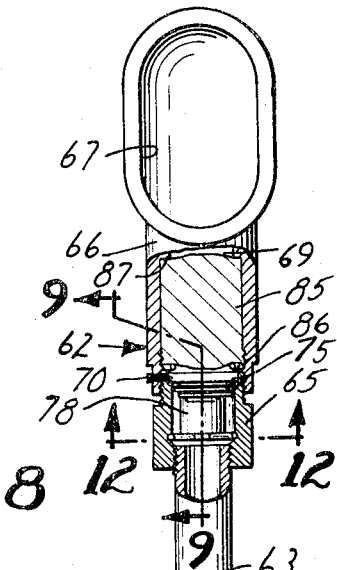
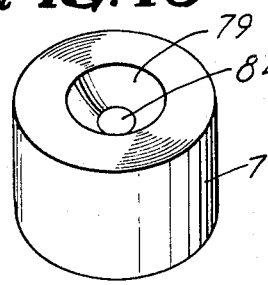
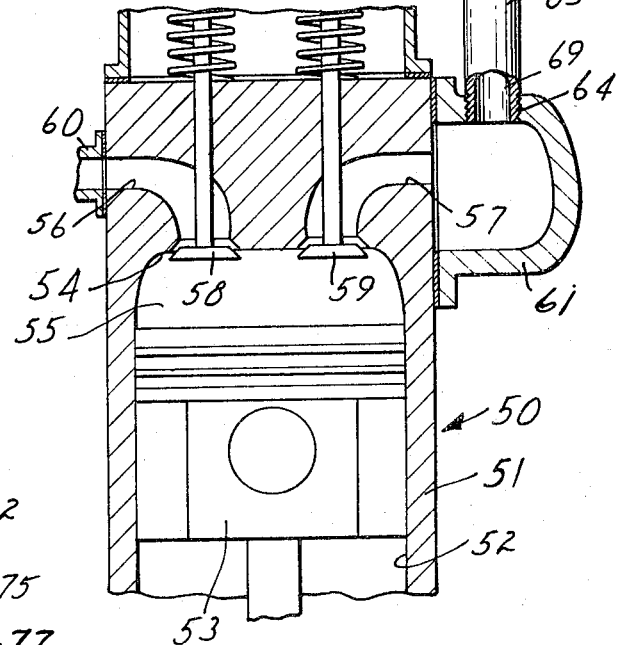
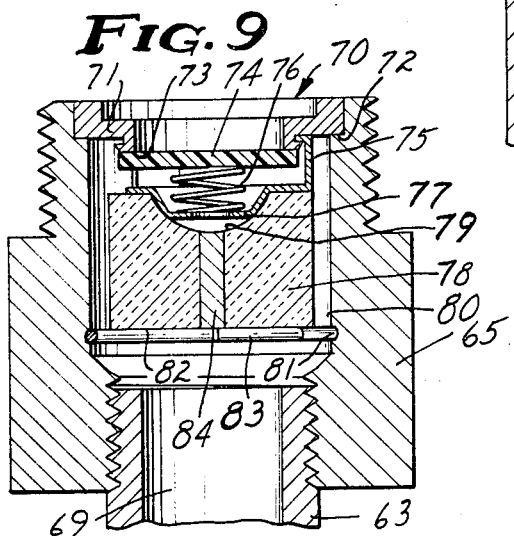
INVENTOR.
FRED P. MATTSON
BY
Merchant & Gould
ATTORNEYS July 2, 1968 F. P. MATTSON 3,390,520
AIR SUPPLYING DEVICE FOR INTERNAL-COMBUSTION ENGINES
Filed Aug. 4, 1967 3 Sheets-Sheet 3

INVENTOR.
FRED P. MATTSON
BY
Merchant & Gould
ATTORNEYS

United States Patent Office 3,390,520
Patented July 2, 1968

3,390,520
AIR SUPPLYING DEVICE FOR INTERNAL-
COMBUSTION ENGINES
Fred P. Mattson, Elmwood, Wis., assignor to Exhaust
Controls, Inc., Elmwood, Wis., a corporation of
Minnesota
Continuation-in-part of application Ser. No. 380,509,
July 6, 1964. This application Aug. 4, 1967, Ser.
No. 660,168
10 Claims. (Cl. 60—30)

ABSTRACT OF THE DISCLOSURE

A device for supplying additional air to the unburned fuel components from an internal-combustion engine, characterized by an air horn directed toward the cooling air for the engine and a hollow body member secured to the engine exhaust manifold, and by a valve device open in response to low pressures in the manifold and by means for shielding the valve device against hot gases from the manifold.

Related application

This application is in the nature of a continuation-in-part of my application for U.S. Letters Patent, filed July 6, 1964, Ser. No. 380,509, and entitled "Air Supplying Device for Internal-Combustion Engines"; and relates to the structure disclosed and claimed in said prior application in addition to other modifications of said structure.

Background of the invention

Since many automotive vehicles operate with mixtures richer than those indicated for complete combustion in order to improve the power, such rich mixtures result in unburned components often high in oxides which give rise to smog conditions. It has been found that the introduction of additional air to the exhaust system effects more complete combustion of the unconsumed products of engine combustion in the exhaust system. Since the power pulses from the cylinders vary according to the valve overlap, a cyclic variation of pressure takes place in the exhaust manifold, and upon a reduction in the manifold pressure, extra air can be introduced thereto. Various devices have been employed to add air to the exhaust manifolds of internal-combustion engines for the purpose set forth, these devices utilizing check valves for preventing escape of the gases from the manifold, other than through the exhaust system, during periods of higher exhaust manifold pressure. Since these valves must be light in weight, some being spring biased toward closed positions, they are often easily damaged and rendered inoperable when subject to excessive heat of the exhaust gases.

Summary of the invention

An important object of this invention is the provision of a device for supplying air to the exhaust manifold of an internal-combustion engine, and including a check valve and means for shielding the check valve against heat from the exhaust manifold and from the hot gases of combustion in the manifold. To this end, I provide body means in the nature of a tubular member having one end adapted to be connected to an exhaust manifold, and having an air horn at its opposite or air inlet end. The air horn includes an enlarged bell-like mouth or inlet disposed to face the stream of cooling air for the engine and supplied by the usual fan or blower for cooling the engine, or generated as a result of forward movement of the engine driven vehicle. The body means defines an air passage from the air horn to the manifold, and the check valve is disposed in the body means in close proximity to the air horn to open and close the passage responsive to changes in pressure differential between the air horn and the manifold connected end of the tubular member. The valve shielding means is disposed in the passage between the check valve and the manifold connected end of the tubular member in close proximity to the check valve, and operates to aid in distribution of incoming air through the passage to cool the tubular member, and to shield the check valve from the hot gases in the manifold when the check valve is closed. A filter element in the air horn not only filters the air delivered to the manifold, but also effectively acts as a noise muffler.

Description of the drawings

In the accompanying drawings, which illustrate the invention, like reference characters indicate like parts throughout the several views.

FIG. 1 is side view of an air supplying device produced in accordance with the invention;

FIG. 2 is a vertical cross sectional view of the device of FIG. 1;

FIG. 3 is a fragmentary cross sectional view illustrating a modified cooling tube;

FIG. 4 is a transverse cross sectional view taken on the line 4—4 of FIG. 3;

FIG. 5 is a cross sectional view through a vacuum operated valve provided as a separate unit to be inserted into the assembly;

FIG. 6 is an alternate embodiment of the device of FIG. 1 showing the same provided with a fitting extending into the manifold to give a venturi effect at the end thereof;

FIG. 7 is a view in perspective of an internal-combustion engine showing a modified form of the invention mounted thereon, some parts being broken away and some parts being shown in section;

FIG. 8 is a fragmentary axial section of a portion of the engine of FIG. 7, the air supplying device of FIG. 7 being shown in front elevation, some parts being broken away and some parts being shown in section;

FIG. 9 is an enlarged fragmentary section taken substantially on the line 9—9 of FIG. 8, some parts being removed;

FIG. 10 is a view in perspective of the valve shielding means of FIGS. 7–9;

General description

Figure 11:
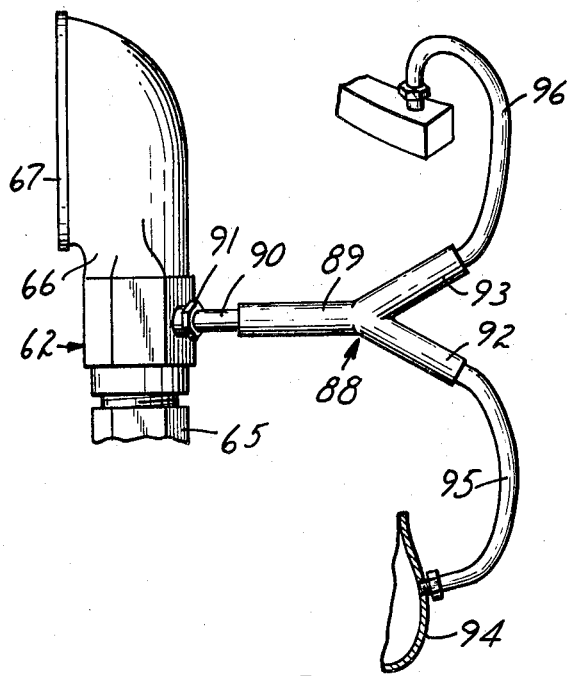
FIG. 11 is a fragmentary view partly in side elevation and partly in perspective of the arrangement illustrated in FIG. 7.

In the embodiment of the invention illustrated in FIGS. 1–4, the air supplying device, indicated in its entirety by the numeral 10, is shown as comprising a tubular body member 11 having fins 11a for radiating heat from the body member 11. The lower end 12 of the body member 11 is threaded at 13, for engagement with an exhaust manifold 13a of an internal-combustion engine or diesel engine.

The upper end of the body member 11 is threaded as shown to receive an air horn or scoop member 15 having an open bell-like end or mouth 16 directed toward a blast or stream of cooling air for the radiator, not shown, of the engine. The air horn 15 threadably engages the body member 11 at 17.

The upper end of the body member 11 is adapted to support a circular valve supporting member 18. A washer 19 is pressed into the member 18, and provides an abutment for a valve disk 21 urged thereagainst by a light valve spring 23 having its other end abutting a spider 20 formed as part of the valve supporting member 18.

A filter 24 of fibrous material is located within the air horn 15, and is held between an upper washer 25 having a central opening 26, and a lower screen cup 27 having a flange 27a bearing against the valve supporting member 18. The fibrous material removes dust from the entrant air, and also serves to muffle partly the operation of the engine. The cup 27 is spaced from the washer 19 to define a chamber 28. A tube 29 extends horizontally through the wall of the air horn 15, and receives a tubular hose 30 which leads to the crankcase of the engine to provide a current of air to sweep gases from the crank case.

A cooling draft of air is introduced to the body member 11 beneath the valve mechanism described, and includes a tubular member 31 extending laterally therethrough immediately below the spider 20. Tubular member 31 is tapped into the wall of the body member as shown, and the forward protruding end thereof is provided with a scoop or air horn 32 directed toward the air stream.

As seen in FIGS. 3 and 4, the tubular member 31 is provided with a plurality of annular ribs or flanges 36 to increase the heat transfer effect of the air received at the scoop 32 and moving through the tubular member 31.

Referring now to FIG. 5 of the drawings, there is shown a valve assembly which is separable as a unit from the device thus far described. In this embodiment, the valve assembly includes a valve seat member 36' having a flange 37 surmounting a marginal flange of a valve spider 38, the flange 37 and marginal edge portion of the spider 38 resting upon a threaded extension 39 of a nut 41. The flange 37 and marginal edge portion of the spider 38 are held between the threaded extension 39 and a shoulder 42 formed internally on the air horn 15 which in turn is threaded to the extension 39. The nut 41 is adapted to be received on the hollow body member 11 in the manner described in connectioin with FIGS. 1–4.

Referring now to FIG. 6 of the drawing, there is shown another embodiment of the invention denoted by the reference numeral 40. In this embodiment the assembly described with reference to the previous drawings is threaded into an elbow-like fitting 43 having an upper threaded flange nut 44 received into a threaded opening 46 in the exhaust manifold 13a. The fitting 43 has a horizontally extending leg 47 extending in the direction of flow of the exhaust gases through the exhaust manifold. The presence of the fitting 43 gives a certain venturi effect to the air moving through the device according to the invention.

The operation of the device is believed apparent from the description thus far. It should be noted that the pressure obtained in the manifold 13a varies according to the amount of engine valve overlap. At times, the exhaust manifold 13a is subect to pressures in excess of atmospheric but such pressures to values below atmospheric, this being atempted to be satisfied by back flow through the exhaust system. Since such flow is generally over a long and tortuous path, the satisfaction of pressures to atmospheric cannot be attained.

Accordingly, and upon the reduction of the pressure in the manifold 13a to values less than atmospheric, the valve assembly of the device opens to admit therepast a rush of air designed to satisfy the pressure to atmospheric and at the same time introduce a quantity of air to provide for completion of combustion of unburned or partially burned fuel components.

As shown in FIGS. 2–4, the tubular body member 11 and air horn 15 define an air passage, the tube 31 extending transversely of the passage. During periods of operation, when the valve disk 21 is in its valve open position, the tube 31 diverts the downwardly moving air generally toward the inner wall surface of the tubular body member 11 to cool the same. When the valve disk 21 is in its valve closed position, the tube 31 is highly effective in preventing hot gases from the interior of the manifold 13a from unduly heating the various components of the check valve, including the disk 21, spider 20 and spring 23.

In the modified form of the invention illustrated in FIGS. 7–12, a conventional internal combustion engine of the V-8 variety is indicated in its entirety by the numeral 50. As shown, the engine 50 comprises a cylinder block 51 defining a pair of banks of cylinders 52, one of the cylinders being fragmentarily shown in FIG. 8 and having a piston 53 mounted therein; a pair of cylinder heads 54 mounted on the cylinders 50 and cooperating therewith and the pistons 53 to define combustion chambers 55. The cylinder heads 54 define intake and exhaust ports 56 and 57 respectively, and intake and exhaust valves 58 and 59 respectively for the ports 56 and 57. The inlet ports 56 communicate with an inlet manifold 60, the exhaust ports 57 communicating with exhaust manifolds 61, one of which is shown in FIGS. 7 and 8.

The modified form of air supplying device shown in FIGS. 7–12 is indicated in its entirety by the numeral 62, and comprises body means including an elongated tubular member 63 having screw threaded upper and lower ends, the latter of which is screw threaded into the exhaust manifold 61, as indicated at 64, a check valve containing member 65 screw threaded on the upper end of the tubular member 63, and an air horn 66 screw threaded on the upper end of the check valve containing member 65 and including a bell-like mouth or inlet portion 67. One or more of the devices 62 may be connected to each exhaust manifold 61, FIG. 7 illustrating the use of a pair of spaced devices 62 on one exhaust manifold 61. Preferably, the bell-like mouths 67 of the devices 62 are directed toward the front end of the engine, so as to be directed toward the stream of cooling air generated by the usual engine fan, not shown, but which may be assumed to be mounted on an engine driven fan pulley 68.

The tubular member 63, check valve containing member 65 and air horn 66 cooperate to define an elongated air passage 69, that is normally closed by a check valve 70 mounted in the containing member 65, see particularly FIG. 9. The check valve 70 comprises an annular member 71 that is press fitted into a recess 72 in the member 65 and which defines an annular baffle seat 73, a disk-like valve element 74 normally engaging the valve seat 73, a spider 75 rigidly secured to the annular member 71, and a coil compression spring 76 seated at one end on an axially depressed central portion 77 of the spider 75, the opposite end of the spring 76 engaging the undersurface of the valve element 74 and urging the same into sealing engagement with the annular valve seat 73. The check valve 70 operates in the same manner as those shown in FIGS. 2, 3 and 5.

The cylindrical shield element 78 is disposed within the valve containing member 65 coaxial with the passage 69, and at its upper end is provided with an axially upwardly opening recess 79 which is adapted to contain the depressed portion 77 of the spider 75. The shield element 78 is of a diameter slightly less than that of the portion of the passage 69 through the valve containing member 65 and cooperates therewith to define an annular passage portion 80. The valve containing member 65 is formed to provide a radially inwardly opening circumferential groove 81 for reception of a generally circular retaining ring 82 having inturned opposite end portions 83 that underlie and support the shield element 78 in underlying engagement with the spider 75. The shield element 78 may be made from any suitable heat resistant or insulating material, but is preferably made from asbestos in sheet form or asbestos paper rolled into cylindrical form to provide a multiplicity of spiral convolutions adhered together with a suitable binder for adhesive, such as a compound of silicate of soda to form a solid mass. In the embodiment shown in FIGS. 9 and 10, the sheet asbestos material is rolled up on a central core 84 also made of suitable heat resistant material, such as asbestos. As shown, the shield element 78 extends transversely of the passage 69 and, when the valve element 74 is opened by air passing downwardly through the passage 69, the shield element 78 guides or directs the downwardly flowing air outwardly toward the peripheral portion of the passage 69, to cool the tubular member 63 and valve containing member 65. When the pressure of gases within the manifold 61 and tubular member 63 is such, relative to that at the mouth 67 of the air horn 66, to permit closing of the check valve 70 by its springs 76, the shield element 78 effectively shields the valve 70 against the heat of gases of combustion in the exhaust manifold 61.

That portion of the passage 69 within the air horn 66 is substantially filled with a filter and noise muffler element 85 of suitable material such as resilient plastic material in sponge form, the same being supported in the air horn 66 by a retaining ring 86 similar to the retaining ring 82. As shown in FIG. 8, the interior of the air horn 66 is formed to provide an annular stop shoulder or the like 87 against which the upper end of the filter and muffler element 85 abuts.

Advantage is taken of the substantial air pressure within the mouth 67 of the air horn 66 to provide for ventilation in the crankcase of the engine 50, and to supply air to the intake manifold 60. A Y-shaped fitting 88 has its main stem 89 communicating with the air passage 69 in the air horn 66 above the check valve 70, by a tube 90 and connecting bushing 91, see FIG. 11. The fitting 88 has branch stems 92 and 93 the former of which communicates with the crankcase 94 of the engine 50 by a tube 95 and the latter of which communicates with the intake manifold 60 by a tube 96. In view of the fact that air pressure at the mouth 67 is more than sufficient to supply the demands of the exhaust manifold 61, a steady stream of air flows through the fitting 89 and tube 95 to the crankcase 94 to adequately ventilate the same. Further, during periods of engine operation, when the intake manifold is subject to high vacuum, such as when the engine is decelerating and the throttle valve, not shown, of the engine carburetor is closed, the high vacuum is relieved by movement of air through the fitting 89 and tube 96, eliminating to a large extent the suction of liquid fuel from the carburetor through the idling jet thereof.

Figure 13:
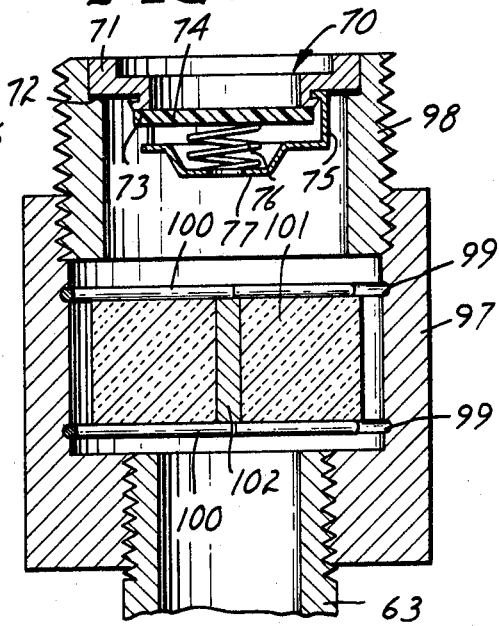
FIG. 13 is a view corresponding to FIG. 9, but showing a still further modified arrangement.
Figure 12:
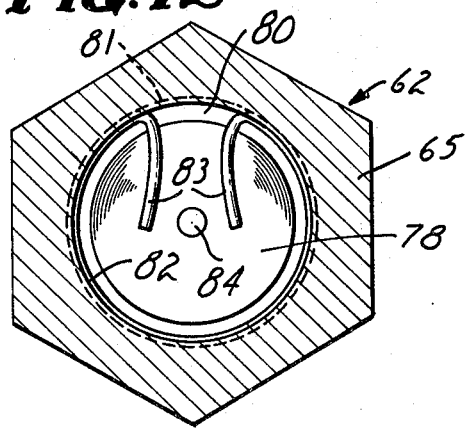
FIG. 12 is an enlarged transverse section taken on the line 12—12 of FIG. 8.

In the modified form of valve containing member, shown in FIG. 13, the valve containing member is thereshown as comprising a pair of container sections 97 and 98, the former being screw threaded on the upper end of the tubular member 63, and the section 98 being screw threaded into the section 97, the upper end of the section 98 is counterbored to receive the check valve 70, the section 97 being provided with a pair of axially spaced radially inwardly opening annular grooves 99 for reception of a pair of retaining rings 100 similar to the retaining ring 82. The retaining rings 100 cooperate to support a cylindrical shield element 101 therebetween in downwardly spaced relation to the overlying check valve 70 and in axial alignment therewith. The shield element 101 is similar to the shield element 78, having a central core 102 similar to the core 84. It will be noted that the shield element 101 is flat at its opposite ends, in view of its downwardly spaced relationship to the overlying check valve 70.

While I have shown and described several forms which my air supply device may take, it will be understood that the same is capable of further modification without departure from the spirit and scope of the invention, as defined in the claims.

What is claimed is:

1. A device for supplying air for the combustion of unburned fuel components from an internal-combustion enging having an exhaust manifold, comprising:

(a) elongated hollow body means including an air horn at one end and means at its opposite end for connecttion to the exhaust manifold and defining an air passage from said horn to the manifold, said air horn having a bell-like mouth for reception of air from a cooling stream of said air for the engine;

(b) a check valve mounted in said air passage in close proximity to said air horn and including a valve seat, a cooperating valve element, and yielding means urging said valve elements toward said valve seat, said check valve being arranged to be opened by pressure differential between the mouth of the air horn and said passage adjacent the exhaust manifold, against bias of said yielding means, when said passage adjacent the manifold is under predetermined pressure less than the pressure at the mouth of said air horn;

(c) and means for shielding said check valve from hot gases in said manifold and comprising a shield element extending transversely of said passage between said check valve and opposite end of the body means and in close proximity to said check valve, said shield element being disposed to guide incoming air from the axis of said passage toward the peripheral portion of said passage whereby to cool said body means between said check valve and said manifold, when the check valve is open, and to provide a baffle against the heat of gases from said manifold toward said check valve, when the check valve is closed.

2. The device defined in claim 1, in which said shield element comprises a tube extending transversely through said body means and having a plurality of axially spaced radially outward projecting annular cooling fins disposed within said passage.

3. The device defined in claim 2, characterized by a second air horn on one end of said tube exterior of said body means.

4. The device defined in claim 1 in which said means for shielding said valve comprises a generally cylindrical shield element of heat resistant material disposed coaxially with said passage, characterized by a mounting element in said body means for supporting said cylindrical shield element in said passage, said cylindrical shield element having a diameter less than that of the adjacent portion of said passage and cooperating with said body means to define an annular passage portion.

5. The device defined in claim 4, in which said check valve includes a spider portion for supporting said yielding means, said cylindrical shield element having an axially outwardly opening recess at one end for reception of a portion of said spider, said mounting element engaging the other end of said cylindrical shield element against said spider.

6. The device defined in claim 4 in which said cylindrical shield element is formed from an elongated strip of asbestos paper in sheet form rolled up to provide a multiplicity of spiral convolutions adhered together with a heat resistant binder.

7. The device defined in claim 1, in which said body means comprises a tubular member having screw threaded upper and lower ends, the threaded lower end comprising said means for connection to the manifold, and a check valve containing member screw threaded on the upper end of the tubular member, said air horn having screw threaded engagement with said valve containing member in axial alignment with said tubular member.

8. The device defined in claim 1, in which said means for shielding said valve comprises a generally cylindrical shield element of heat resistant material disposed coaxially with said passage, characterized by a pair of axially spaced radially inwardly opening annular grooves in said body means, and a pair of resilient retainer members each mounted in a different one of said grooves and each having a portion engaging an adjacent end of said cylindrical shield element to support said cylindrical shield element in said passage, said cylindrical shield element having a diameter less than that of the adjacent portion of said passage and cooperating with said body means to define an annular passage portion.

9. The device defined in claim 1, characterized by a filter and noise muffler element in said air horn between the mouth thereof and said check valve.

10. The device defined in claim 1, characterized by a tubular air outlet fitting secured to said body means and communicating with said passage between said mouth and said check valve, said fitting having a pair of branch members adapted for connection to the crankcase and intake manifold respectively of the engine to provide ventilating air to said crankcase and added air to said intake manifold.

References Cited
UNITED STATES PATENTS

| | | | |
|---|---|---|---|
| 1,465,904 | 8/1923 | Herdle | 60—30 |
| 2,649,685 | 8/1953 | Cohen | 60—30 |
| 3,253,401 | 5/1966 | Wells | 60—30 |
| 3,263,412 | 8/1966 | Thompson | 60—30 |
| 3,314,230 | 4/1967 | Vanderpoel | 60—30 |

RALPH D. BLAKESLEE, *Primary Examiner.*